United States Patent [19]

Ohga et al.

[11] Patent Number: 4,908,855
[45] Date of Patent: Mar. 13, 1990

[54] ELECTRONIC TELEPHONE TERMINAL HAVING NOISE SUPPRESSION FUNCTION

[75] Inventors: Juro Ohga, Kamakura; Kensaku Fujii, Yamato; Hiroyuki Masuda, Kawasaki; Yuka Sato, Yokohama, all of Japan

[73] Assignee: Fujitsu Limited, Kawasaki, Japan

[21] Appl. No.: 219,607

[22] Filed: Jul. 15, 1988

[30] Foreign Application Priority Data

Jul. 15, 1987 [JP] Japan .................. 62-177679
Mar. 17, 1988 [JP] Japan .................. 63-64271

[51] Int. Cl.$^4$ ............................. H04M 1/60
[52] U.S. Cl. ........................... 379/387; 379/395; 379/390; 381/113; 381/114
[58] Field of Search ............ 379/387, 390, 395, 389; 381/114, 113, 111, 94, 57

[56] References Cited

U.S. PATENT DOCUMENTS

| | | |
|---|---|---|
| 3,410,958 | 11/1968 | Cohen ........................ 381/57 |
| 3,588,360 | 6/1971 | Knox . |
| 4,068,092 | 1/1978 | Ikoma et al. . |
| 4,513,177 | 4/1985 | Nishino et al. . |
| 4,696,032 | 9/1987 | Levy ...................... 381/113 X |

FOREIGN PATENT DOCUMENTS 2221885  3/1974  France .
2161047  1/1986  United Kingdom .

OTHER PUBLICATIONS

Patent Abstracts of Japan, vol. 8, No. 239 (E-276) [1676], Nov. 2, 1984; & JP-A-59 117 849 (Nippon Denshin Denwa Kosha) 07-07-1984.

Primary Examiner—James L. Dwyer
Attorney, Agent, or Firm—Staas & Halsey

[57] ABSTRACT

An electronic telephone terminal having a transmitter and a receiver, both having an approximately linear acoustic-to-electric transduction characteristics, and having a surrounding noise suppression function, and including a variable attenuator for controlling a gain of a transmission system; a noise detection device for detecting surrounding noise; and a control device for controlling the variable attenuator in such a manner that when a sound pressure level input to the transmitter exceeds a predetermined threshold value, the gain is fixedly set to a constant value, and when the input sound pressure level is equal to or below the predetermined threshold level, the gain is controlled in response to a change in the surrounding noise level detected by the noise detection device.

17 Claims, 20 Drawing Sheets

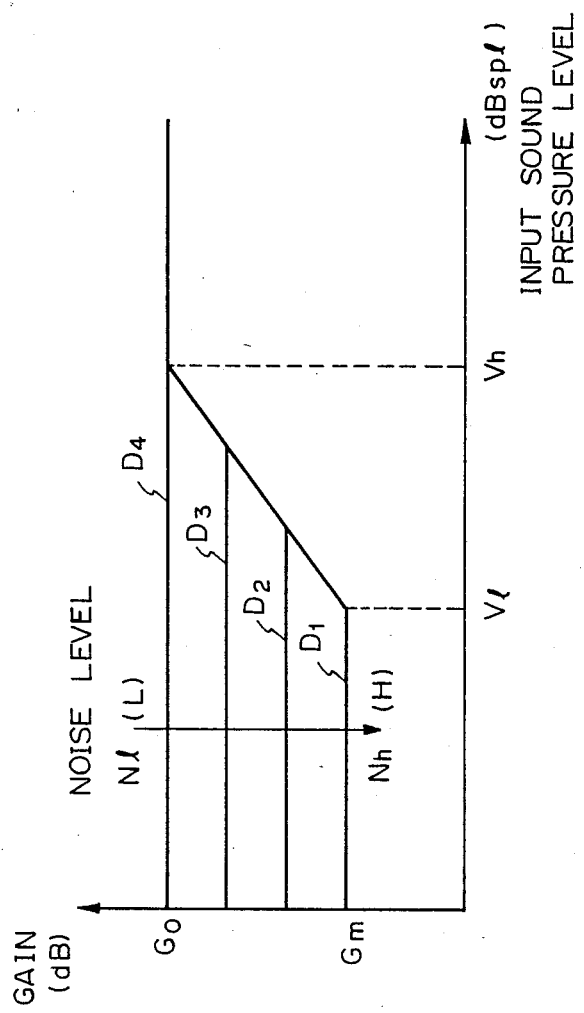

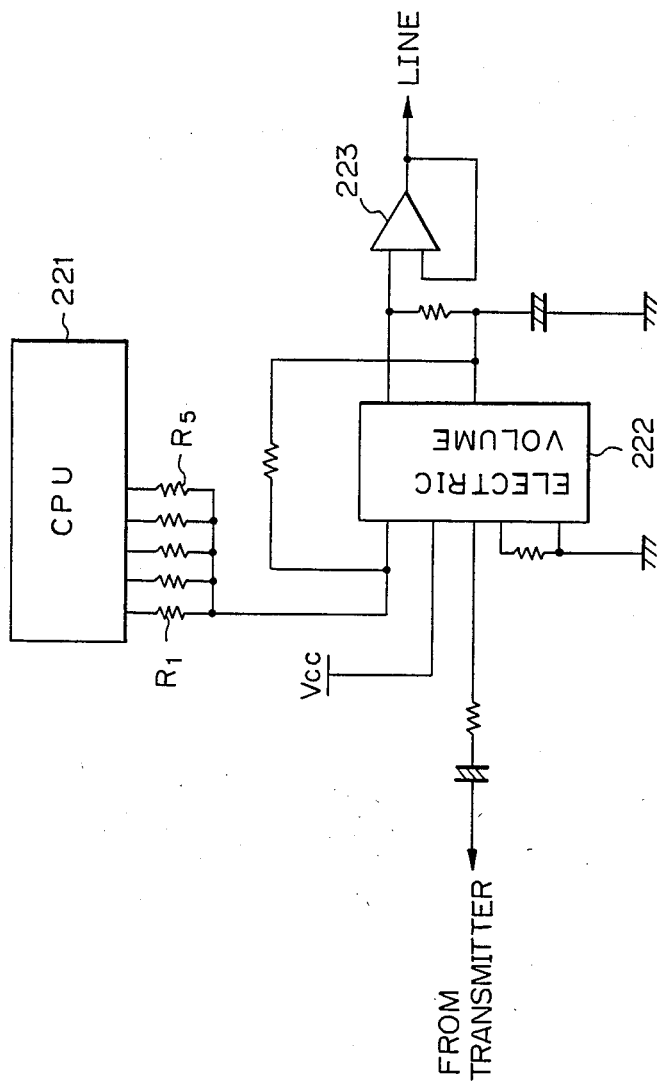

ELECTRONIC TELEPHONE TERMINAL HAVING NOISE SUPPRESSION FUNCTION

BACKGROUND OF THE INVENTION

1. Field of the Invention

The present invention relates to an electronic telephone terminal (hereinafter referred to as the terminal) and, more particularly, it relates to such a terminal having an improved noise suppression function in a transmission system thereof.

In general, such a terminal is constituted by a reception system having an amplifier and a telephone receiver, and a transmission system having a transmitter (usually a microphone) and an amplifier.

In the terminal, particularly, in the transmission system according to the present invention, incoming noise received by the microphone from the surrounding environment can be effectively suppressed even when numerous.

2. Description of the Related Art

Conventionally, a carbon type microphone is widely used as a telephone transmitter, since the carbon microphone has many advantages. For example, the carbon microphone features a simple and solid structure and an effective noise suppression effect. The noise suppression effect is particularly important in this type of transmitter. For example, when the input sound pressure level is 90 to 100 dB, the sensitivity (gain) of the carbon type microphone to the input sound becomes 50 dB (where, 0 dB is $\sqrt{watt/\mu bar}$ or $\sqrt{W/0.1\ Pa}$). But when the surrounding noise below is under 70 dB, the gain of the carbon type to the surrounding noise becomes about 40 dB. Accordingly, the apparent noise-to-signal ratio (S/N) is improved to the extent of 5 to 10 dB, since the noise from the surrounding environment is suppressed.

Although the noise suppression effect in a carbon type microphone can be obtained by non-linearity at the acoustic-to-electric transduction, this type of microphone has many drawbacks. For example the drawback include, distortion of the signal and unstable sound level, both caused by the above non-linearity. Further, it is difficult to control the quality of the carbon powders included in the microphone.

Recently, various electronic transmitting techniques which utilize, for example, a condenser type or a piezoelectric type microphone and an amplifier consisting of an integrated circuit (IC), have been widely employed in the terminal. In particular, these types of microphones are advantageous from the viewpoint of miniaturization and cost reductions. Further, by using these microphones, the non-linearity of the transmission system can be eliminated, and the distortion of the signal also can be reduced, as these microphones have a full linear characteristic.

Nevertheless, these microphones do not have a noise suppression function. Accordingly, the transmission sound is considerably affected by the surrounding noise, due to the full linear characteristic of the microphones, as mentioned above. Therefore, an IC amplifier having the non-linearity characteristic has been developed to solve the above problems.

Various terminals having a noise suppression function have been disclosed in, for example, the Journal of Technical Disclosure (No. 83-4877, published on May 20, 1983, by JIII), Japanese Unexamined Patent Publication (Kokai) No. 60-126950, and Japanese Examined Patent Publication (Kokai) No. 61-99451.

The first reference (No. 83-4877) discloses an automatic volume adjusting circuit for automatically adjusting the sound volume of a radio, a stereo, a television set, etc., in response to a surrounding noise level detected by a noise detector. But this reference merely discloses a volume adjusting technique and does not control the transmission sound level in response to the surrounding noise level.

The second reference (No. 60-126950) discloses a loudspeaker telephone terminal for detecting the surrounding noise level at a microphone, attenuating the noise level by a variable attenuator, and easily switching between the transmission system and the reception system. This reference, however, merely discloses a technique for easy switching of the sound switch means in the case of a large amount of surrounding noise.

The third reference (No. 61-99451) discloses a telephone terminal using a ceramic type microphone, instead of the carbon type. In this reference, when the level of the input sound is below a threshold value, the output level is lowered to make the characteristic thereof equal to that of the carbon type. In this reference, however, the variable attenuator is not controlled in response to the detected surrounding noise level. Furthermore, this control does not take into account relationship between the input sound pressure level and the surrounding noise level.

SUMMARY OF THE INVENTION

The object of the present invention is to provide an electronic telephone terminal having an improved noise suppression function, particularly in a transmission system thereof.

In accordance with the present invention, there is provided an electronic telephone terminal having a handset including a transmitter and a receiver, both having an approximately linear acoustic-to-electric transduction characteristic, and having a surrounding noise suppression function, comprising: a variable attenuator for controlling a gain of a transmission system; a noise detection device for detecting surrounding noise; and a control device for controlling the variable attenuator in such a manner that when a sound pressure level input to the transmitter exceeds a predetermined threshold value, the gain is fixedly set to a constant value, and when the input sound pressure level is equal to or below the predetermined threshold level, the gain is controlled in response to a change in the surrounding noise level detected by the noise detection device.

Further, in accordance with the present invention, there is provided an electronic telephone terminal having a handset including a transmitter and a receiver, both having an approximately linear acoustic-to-electric transduction characteristic, and having a surrounding noise suppression function, comprising: a variable attenuator for controlling a gain of a transmission system; a noise detection device for detecting surrounding noise; a level detection device for detecting an average sound pressure level of a signal output from the noise detection device, and deciding a gain characteristic in response to a detected noise level; and a control device for controlling the variable attenuator in such a manner that when a sound pressure level input to the transmitter exceeds a predetermined threshold value, the gain is fixedly set to a constant value, and when the input sound pressure level is equal to or below the predetermined threshold level, the gain is controlled in response to a change of the surrounding noise level detected by the noise detection device, and further, the control device controls the variable attenuator based on the gain characteristic decided by the level detection device.

BRIEF DESCRIPTION OF THE DRAWINGS

In the drawings:

FIGS. 13 to 20 are characteristic curves of a gain control according to various embodiments of the present invention;

FIG. 22 is a detailed block diagram of the variable attenuator as one embodiment thereof.

DESCRIPTION OF THE PREFERRED EMBODIMENTS

Before describing the preferred embodiments, an explanation will be given of a conventional microphone amplifier used for a condenser type or a piezo-electric type microphone.

Figure 1:
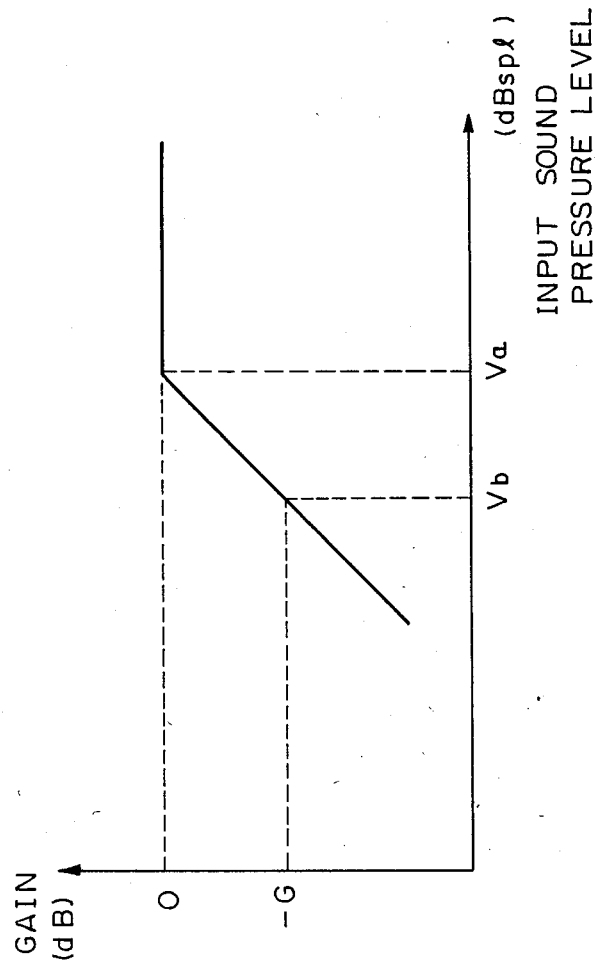
FIG. 1 is a graph for explaining a gain characteristic of a conventional microphone amplifier.

FIG. 1 is a graph for explaining a gain characteristic of the conventional microphone amplifier. This type of amplifier has the same characteristic as that of the carbon type microphone, so that the noise suppression function can be realized. In FIG. 1, the ordinate is a gain (dB) of the amplifier and the abscissa is an input sound pressure level (dB spl). As shown in the graph, the gain characteristic of the amplifier becomes constant when the sound pressure level exceeds a predetermined value $V_a$. When the sound pressure level is below the value $V_a$, the gain decrease at a constant slope. The noise suppression function can be obtained so that the amplifier outputs a signal at the attenuation "0 dB" when the input sound exceeds the value $V_a$, and outputs the signal at the attenuation "G dB" when the input sound level is below the value $V_a$, for example, at the value $V_b$. Accordingly, it is possible to suppress the noise below the value $V_a$ in a non-sound state.

In the conventional microphone amplifier, however, when the input sound is below the value $V_a$, the sound becomes weaker since the sound is attenuated by G dB, as is obvious from the slope shown in FIG. 1. Further, in this attenuation slope, the attenuation quantity is increased or decreased in response to a change in the input sound pressure level, so that the sound pressure level is occassionally emphasized, and accordingly, the sound becomes unnatural because of a distortion of the waveform. As explained above, the conventional microphone amplifier has a drawback in that the attenuation and the distortion simultaneously occur in the low sound pressure level, so that the sound becomes unnatural.

An electronic telephone terminal according to an embodiment of the present invention will now be described.

Figure 2:
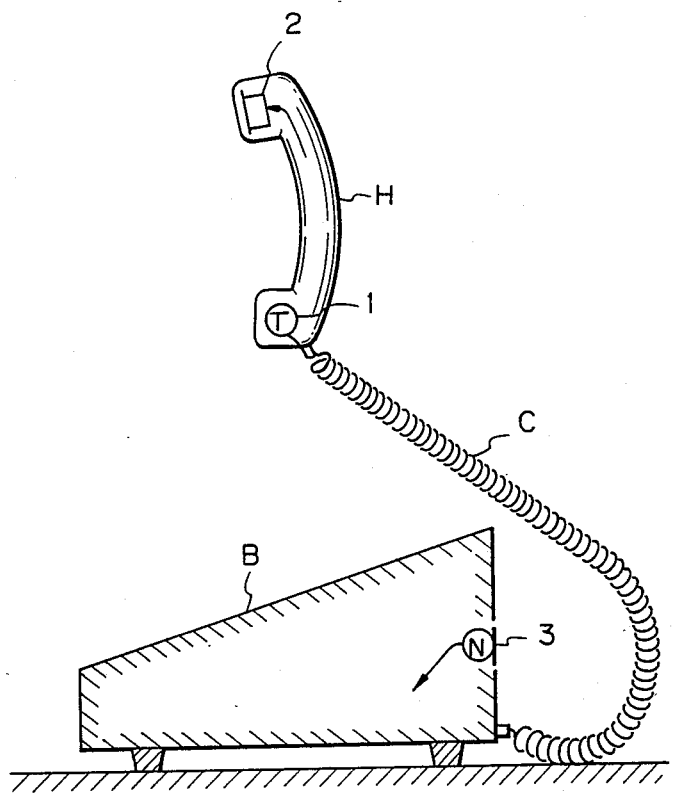
FIGS. 2 to 4 are basic structures of an electronic telephone terminal to which the present invention is applied.
Figure 3:
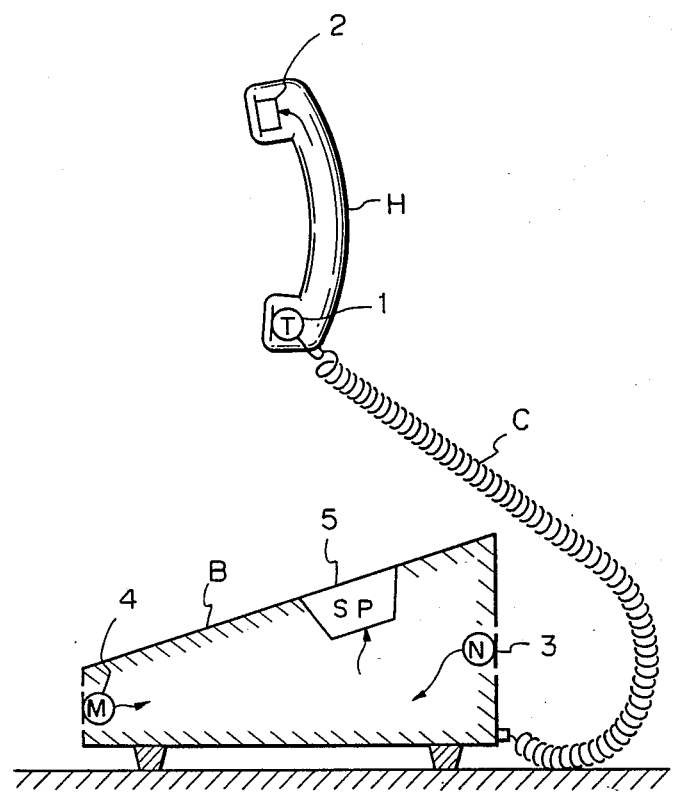
Figure 4:
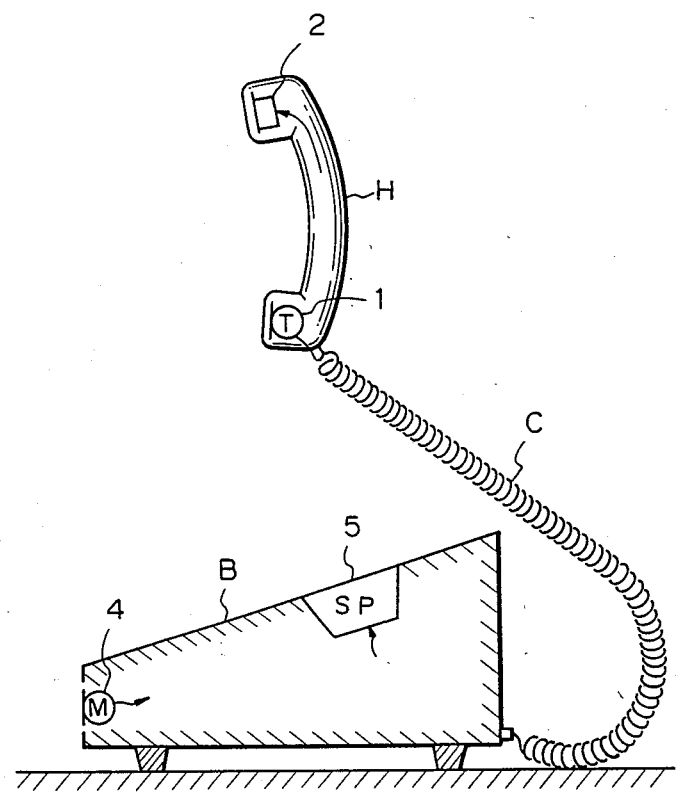

FIGS. 2 to 4 show the basic structures of the electronic telephone terminal.

In FIGS. 2 to 4, B denotes a body of the electronic telephone terminal, and H denotes a handset. A cord C connects the terminal and the handset. Reference number 1 denotes a transmitter (microphone) and 2 denotes a receiver. These elements are mounted in the handset H. Reference number 3 denotes a noise detection microphone, 4 a transmitter microphone, and 5 a loudspeaker. These elements are mounted in the body B (FIGS. 3 and 4 only). The noise detection microphone 3 is mounted at the rear side of the body B, i.e., at the side opposite to an operator, to prevent any influence thereon by sound from the operator.

Figure 5:
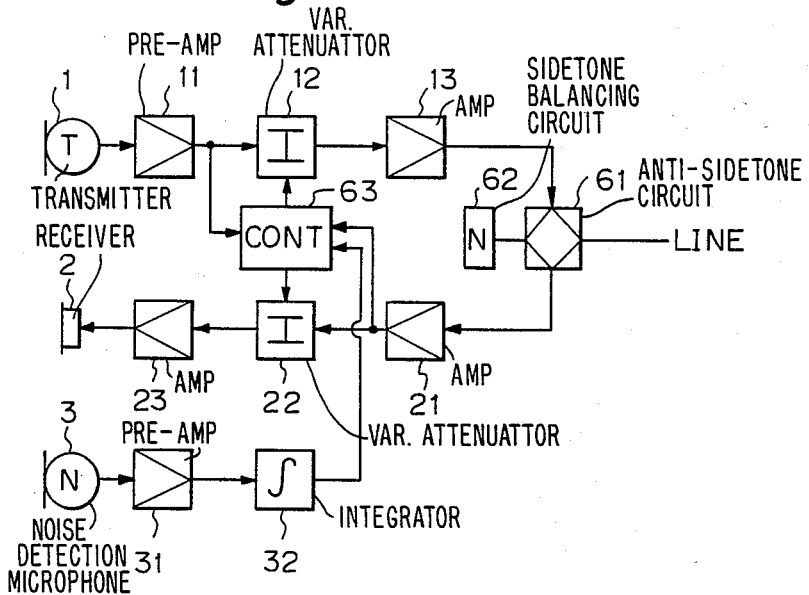
FIG. 5 is a schematic block diagram of a terminal according to a first embodiment of the present invention, which corresponds to the structure illustrated in FIG. 2.

FIG. 5 is a schematic block diagram of the terminal according to a first embodiment of the present invention. This embodiment is for use in the terminal illustrated in corresponding FIG. 2. In FIG. 5, reference number 11 denotes a transmission pre-amplifier, 12 a variable attenuator for the transmission, 13 a transmission amplifier, 21 a reception amplifier, 22 a variable attenuator for the reception, 23 a reception amplifier, 31 a detection pre-amplifier, 32 a rectification integrator, 61 an antisidetone circuit, 62 a sidetone balancing circuit, and 63 a controller.

In this structure, the sound signal from the microphone 1 is transmitted along a line through the pre-amplifier 11, the variable attenuator 12, the amplifier 13, and the antisidetone circuit 61. The reception signal from the line is transmitted to the receiver 2 through the antisidetone circuit 61, the pre-amplifier 21, the attenuator 22, and the amplifier 23. Although the noise detection microphone 3 is mounted at the terminal rear side of the body, the sound from the operator and other noise, are simultaneously input thereto. Usually, sound from the operator is greater than the other noise. The detection signal from the microphone 3 is output to a rectification integrator 32 through a pre-amplifier 31. The rectification integrator 32 has a relatively long time constant, and accordingly, the sound signal in which the change of the envelope of the signal is large is suppressed, and a noise in which the change of the envelope is small is output from the integrator 32. The output of the integrator 32 is input to a controller 63, which adjusts the attenuators 12 and 22 in response to the level of the output from the integrator 32.

Figure 6:
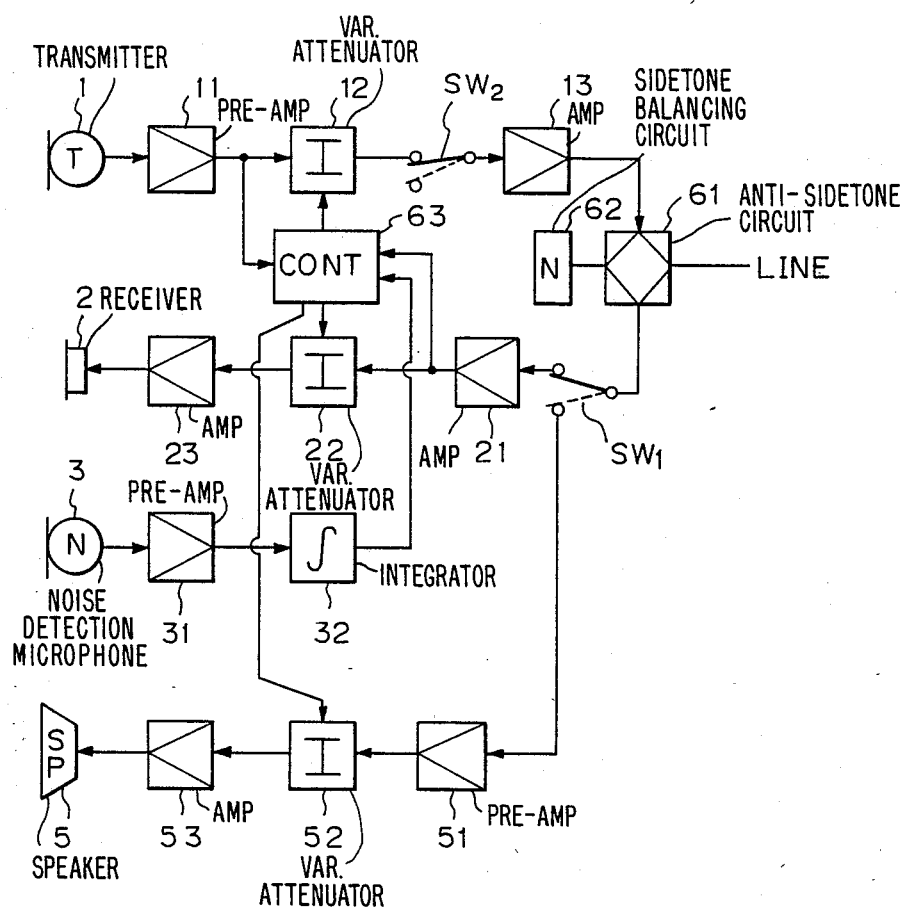
FIG. 6 is a schematic block diagram of the terminal according to a second embodiment, which corresponds to FIG. 3.

FIG. 6 is a schematic block diagram of the terminal according to a second embodiment, which is utilized in a terminal as illustrated in FIG. 3. In FIG. 6, a switch SW$_1$ is provided for switching between the receiver 2 and the loudspeaker 5, and a switch SW$_2$ is provided and turned OFF to prevent howling when the loudspeaker 5 is selected. Reference number 51 denotes a reception pre-amplifier for the loudspeaker 5, 52 a variable attenuator for the loudspeaker 5, and 53 an amplifier for the loudspeaker 5. The reception sound from the line is transmitted to the loudspeaker 5 through the antisidetone circuit 61, the switch SW$_1$, the pre-amplifier 51, the variable attenuator 52, and the amplifier 53. The attenuation quantity of the attenuator 52 is controlled by the controller 63. In this case, it may be possible to arrange the pre-amplifiers 21 and the attenuators 22 and 52 in common.

Figure 7:
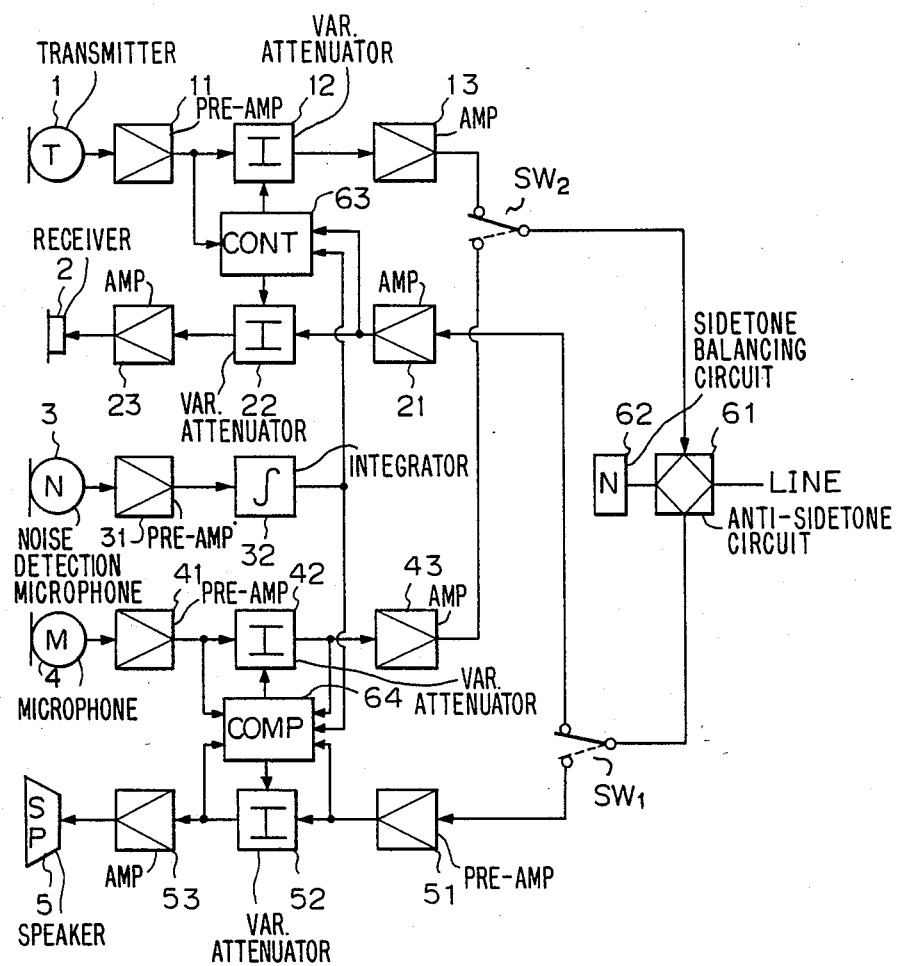
FIG. 7 is a schematic block diagram of the terminal according to a third embodiment, which corresponds to FIG. 3.

FIG. 7 is a schematic block diagram of the terminal according to the third embodiment, which corresponds corresponding to a terminal of the type illustrated in FIG. 3. The terminal shown in FIG. 3 is usually utilized as a hand-free phone. In FIG. 7, reference number 41 denotes a transmission pre-amplifier for the hand-free function, 42 a variable attenuator, 43 a transmission amplifier, and 64 a comparator. The switches SW$_1$ and SW$_2$ are switched between the handset function and the hand-free function. The attenuators 42 and 52 are controlled by the comparator 64 based on the output of the rectification integrator 32. In this case, the maximum gain of the loudspeaker must be selected in such a manner that howling does not occur due to the influence on the microphone 4 of the loudspeaker 5.

Figure 8:
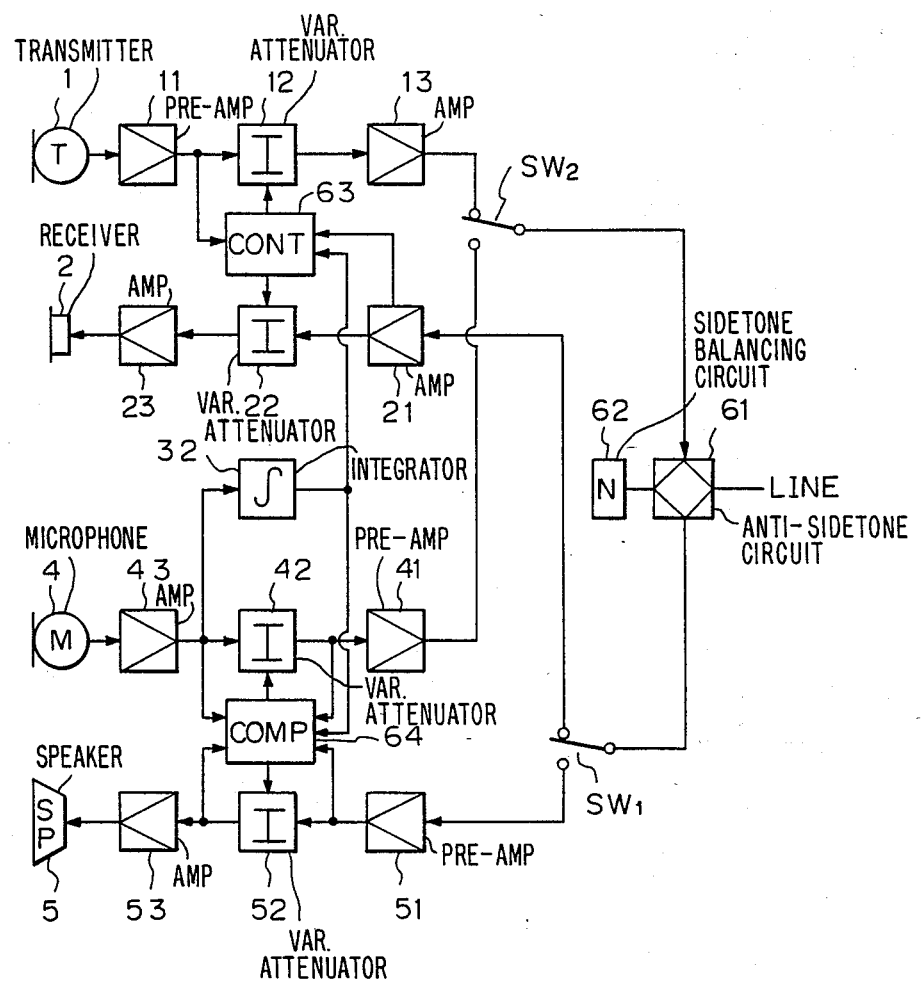
FIG. 8 is a schematic block diagram of the terminal according to a fourth embodiment, which corresponds to FIG. 4.

FIG. 8 is a schematic block diagram of the terminal according to a fourth embodiment, which corresponds to the body in FIG. 4. In this embodiment, the noise detection microphone 3 is omitted and the transmission microphone 4 is used in common for the noise detection and the transmission. As shown in FIG. 3, there is no large difference in the distances between the speaker and the transmission microphone 4, and between the speaker and the noise detection microphone 3. Further, the influence of the size of the body is negligible at a relatively low frequency (under 1 kHz). Therefore, it is possible to use the noise detection microphone 3 and the transmission microphone 4 in the extent of the frequency from 100 to 600 Hz in common. Accordingly, it is necessary to turn these elements ON when the handset is used. In FIG. 8, the controller 63 and the comparator 64 have the same function. Further, it is possible to use the attenuators 12 and 42, and the attenuators 22 and 52 in common.

Figure 9:
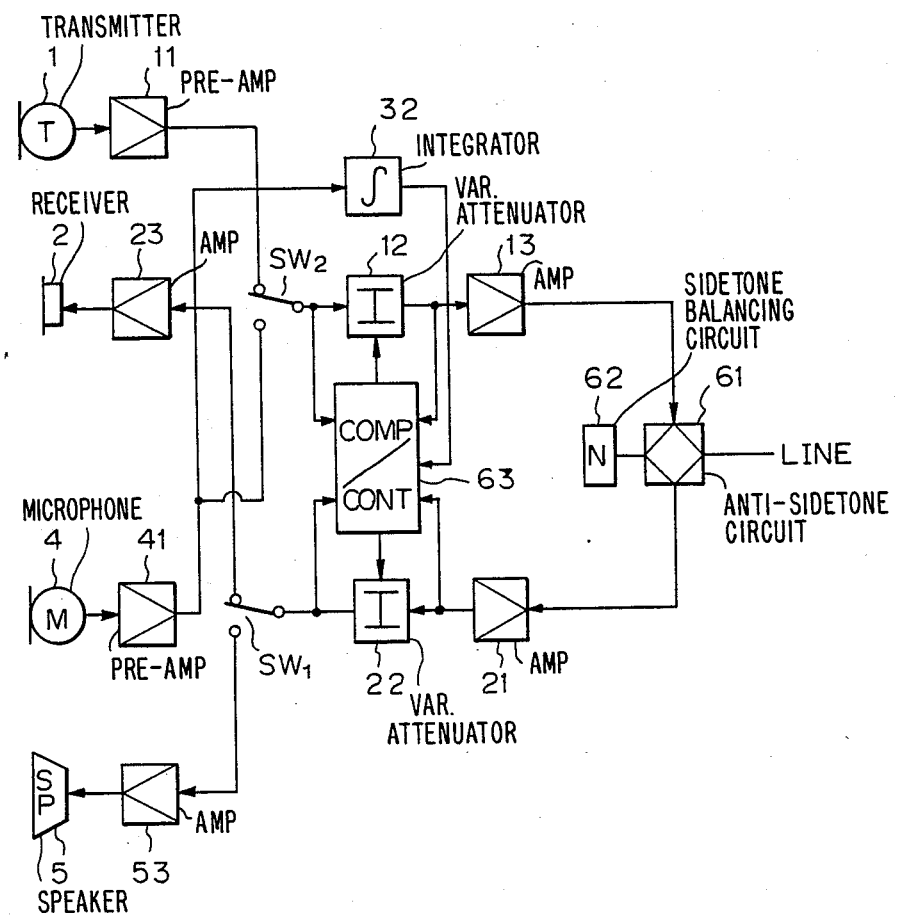
FIG. 9 is a schematic block diagram of the terminal according to a fifth embodiment, which corresponds to FIG. 4.

FIG. 9 is a schematic block diagram of the terminal according to the fifth embodiment, which corresponds to the body in FIG. 4. The attenuators, the amplifiers and the pre-amplifiers are used in common in this embodiment. This structure is simplified in comparison with the structure shown in FIG. 8, and is advantageous in that a microprocessor can be used as the controller/comparator 63.

The noise suppression function according to the present invention will be explained in detail hereinafter.

Figure 10:
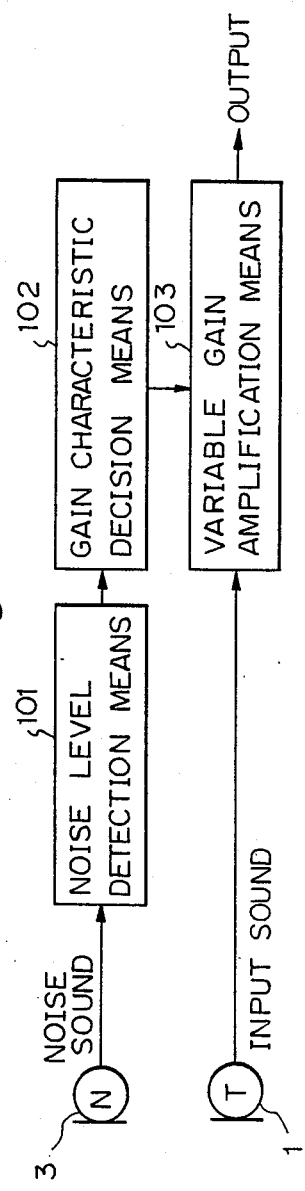
FIG. 10 is a basic block diagram for explaining the noise suppression function.

FIG. 10 is a basic block diagram for explaining the noise suppression function. In FIG. 10, a noise level detection means 101 detects an average sound pressure level of the noise contained in the input sound. This means 101 is included in the rectification integrator 32. A gain characteristic decision means 102 decides the gain characteristic in response to the noise level detected by the noise level detection means 101. This means 102 is included in the controller 63. A variable gain amplification means 103 controls the gain in accordance with the gain characteristic determined by the gain characteristic decision means. This means corresponds to the attenuator and/or the amplifier for the output.

Figure 11:
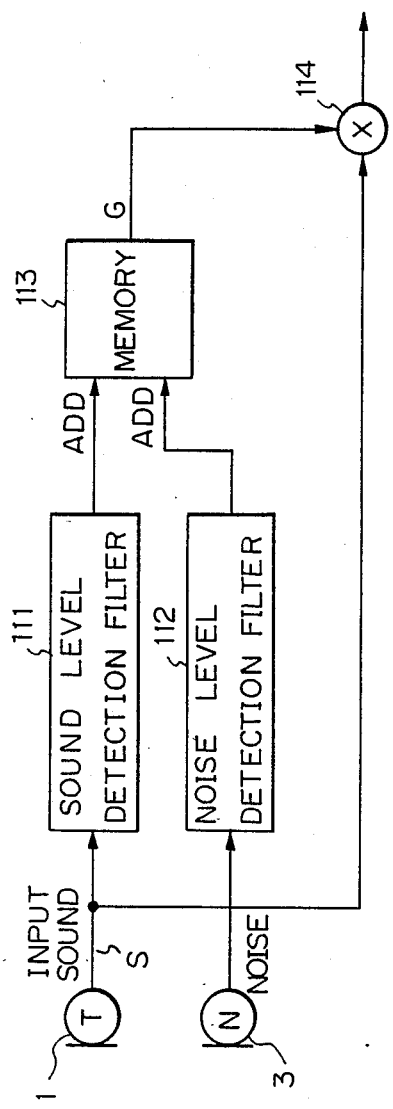
FIG. 11 is a basic circuit arrangement having the noise suppression function.

FIG. 11 is a basic circuit arrangement having the noise suppression function. This circuit is applied when the noise suppression function is realized by a digital technique. The input sound S is a digital signal converted by an analog-to-digital converter (not shown). The signal S is input to a sound level detection filter 111 and a multiplier 114. The sound level detection filter 111 has a short time constant (about 20 msec.) for detecting the input sound pressure level. Likewise, the noise is digitally converted and input to a noise level detection filter 112 which has a long time constant (several seconds) for detecting the average sound pressure level in the noise. The signals from the filters 111 and 112 are output to a memory 113 as an address signal ADD. The filter 111 and the memory 113 are included in the controller 63.

The memory 113 stores the data of the gain value in accordance with the gain characteristic, and the gain value G is output to the multiplier 114 which amplifies the input sound S based on the magnification given by the gain value.

Figure 12:
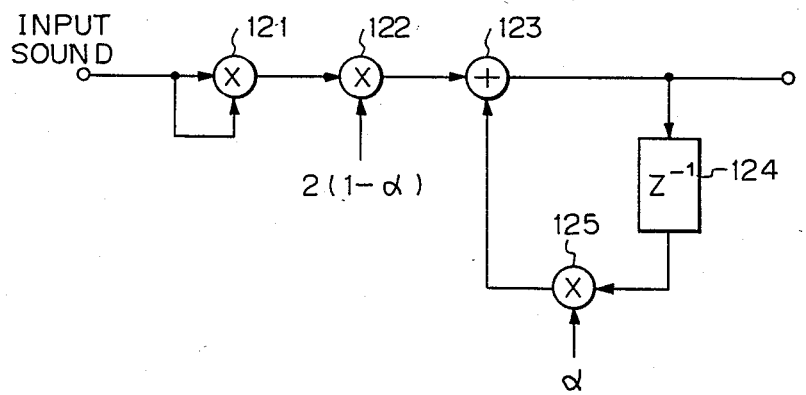
FIG. 12 is a detailed block diagram of a level detection filter shown in FIG. 11.

FIG. 12 is a detailed block diagram of the level detection filter shown in FIGS. 11. This filter is used as the sound level detection filter 111 and the noise level detection filter 112. In FIG. 12, reference numbers 121, 122, and 125 denote multipliers, 123 an adder, and 124 a delay circuit. The input sound is squared by the multiplier 121 and multiplied by a correction value $2(1-\alpha)$ at the multiplier 122. The adder 123, the delay circuit 124, and the multiplier 125 constitute a closed loop as a primary cyclic type filter. The correction value $2(1-\alpha)$ can be obtained as follows. Namely, when the input sound is given by $A \cos(wt)$, and when the input signal sequentially applied to the cyclic filter is given by $$A^2 \cos^2(wt) = A^2 \{1 + \cos(2wt)\}/2,$$

the output of the cyclic filter is given by an asymptotic formula shown by $A^2/\{2(1-\alpha)\}$.

As explained above, the sound level detection filter 111 is a low pass filter having a samll time constant (about 20 msec) with a small filter coefficient $\alpha$ to quickly detect the input sound pressure level in response to a change in the sound level, and the noise level detection filter 112 is a low pass filter having a large time constant (several seconds) with a large filter coefficient $\alpha$. The filter 112 having the large time constant does not quickly follow the change of the sound level, so that the output of the filter is close to the average level of the noise.

FIGS. 13 to 20 are characteristic curves of a gain control according to various embodiments. These curves are stored in the memory and performed in the controller 63 in the transmission system. In the drawings, the ordinate is a gain and the abscissa is an input sound pressure level.

In FIG. 13, when the surrounding noise level exceeds the value $N_h$, and the input sound level exceeds the value $V_h$, the total gain of the transmission system is set to the constant value $G_O$. Then, when the input sound level is below the value $V_h$, the gain of the transmission system is gradually reduced by increasing the attenuation quantity of the variable attenuator 12. Further, when the input sound level is below the value $V_l$, the gain of the transmission system is set to the maximum attenuation quantity $G_m$. This characteristic is shown by the curve $D_1$.

When the noise level is between the value $N_h$ and $N_l$, the gain of the transmission system is adjusted from $G_O$ to $G_m$. The non-linearity portion, i.e., the slope of the characteristic curve, is reduced by this gain control. These characteristic curves are shown by curves $D_2$ and $D_3$.

When the noise level is below the value $N_l$, the gain of the transmission system is set to a constant value regardless of the input sound level by setting the attenuation quantity of the attenuator 12 to a constant value. This characteristic curve is shown by curve $D_4$. The flat portion of the curve denotes a full linear characteristic and the sloped portion denotes the non-linear characteristic.

Figure 14:
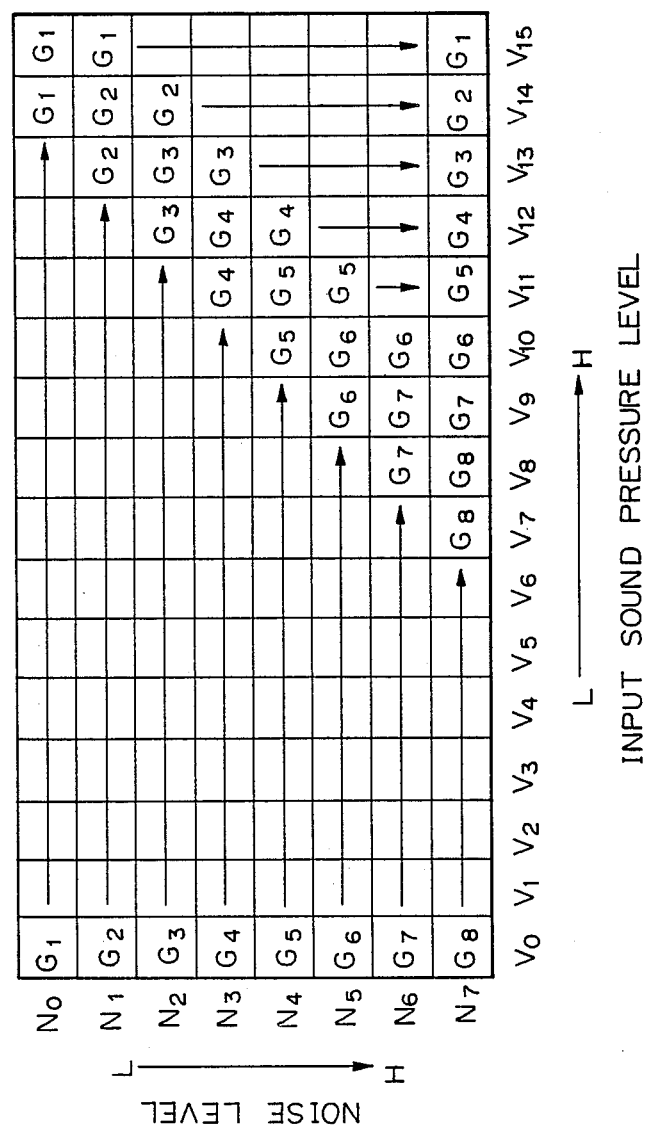

FIG. 14 is a chart for explaining the first embodiment of the gain control shown in FIG. 13. In FIG. 14, the noise level is divided into eight steps $N_0$ to $N_7$, and the gain is also divided into eight steps $G_1$ to $G_8$. Each of the arrowed lines denotes the same gain value as at the start of the arrow line. The noise levels $N_l$ and $N_h$ in FIG. 13 correspond to the noise levels $N_0$ and $N_7$, respectively, and the gains $G_0$ and $G_m$ in FIG. 13 corresponds to the gains $G_1$ and $G_8$. Further, the sound pressure levels $V_l$ and $V_h$ correspond to the sound pressure levels $V_8$ and $V_{15}$, respectively. Accordingly, the characteristic curve $D_1$ corresponds to the row of the noise level $N_7$, and the curve $D_4$ corresponds to the row of the noise level $N_0$.

Figure 15:
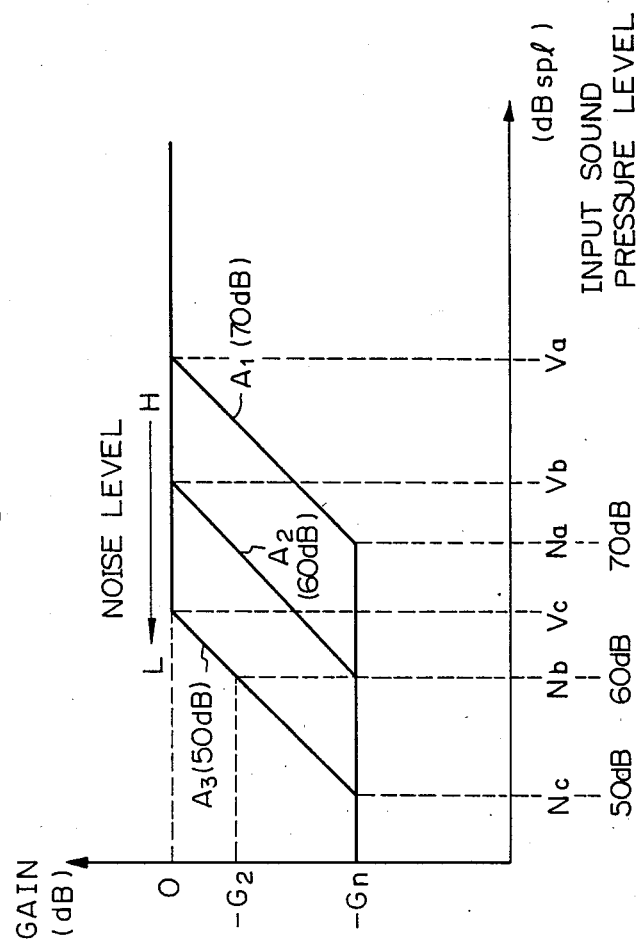

In FIG. 15, the controller controls the variable attenuator in such a manner that when the detected noise level becomes higher, an attenuation start level at the gain characteristic also becomes higher. Namely, the characteristic curve $A_1$, shows the case of a 70 dB noise level, $A_2$ the case of a 60 dB noise level, and $A_3$ the case of a 50 dB noise level. Above the curve $A_1$, when the input sound pressure level exceeds the attenuation start level $V_a$, the input sound is not attenuated. When the input sound pressure level is below the level $V_a$, the gain is reduced along the curve A, in response to the lowering of the input sound pressure level and reaches the maximum attenuation quantity $G_n$ when the input sound pressure level is 70 dB. In FIG. 15, when the noise level is N dB, the attenuation start level $V_n$ is given by "N $+G_n$". Namely attenuation start level and the attenuation end level follow the change in the noise level.

In the curves $A_2$ and $A_3$, the attenuation start levels are shifted to the left, as shown by $V_b$ and $V_c$. In this case, the maximum attenuation quantity also becomes $G_n$. As shown by these curves, when the noise level is low, the attenuation start level is lowered, and accordingly, distortion of the input sound does not occur even if the voice level is low. Nevertheless, even though the low level input sound receives the attenuation and the distortion when the noise level is high, the larger the amount of surrounding noise, the louder the voice. Therefore, the input sound level reaches a sound pressure level at which the distortion does not occur.

Figure 16:
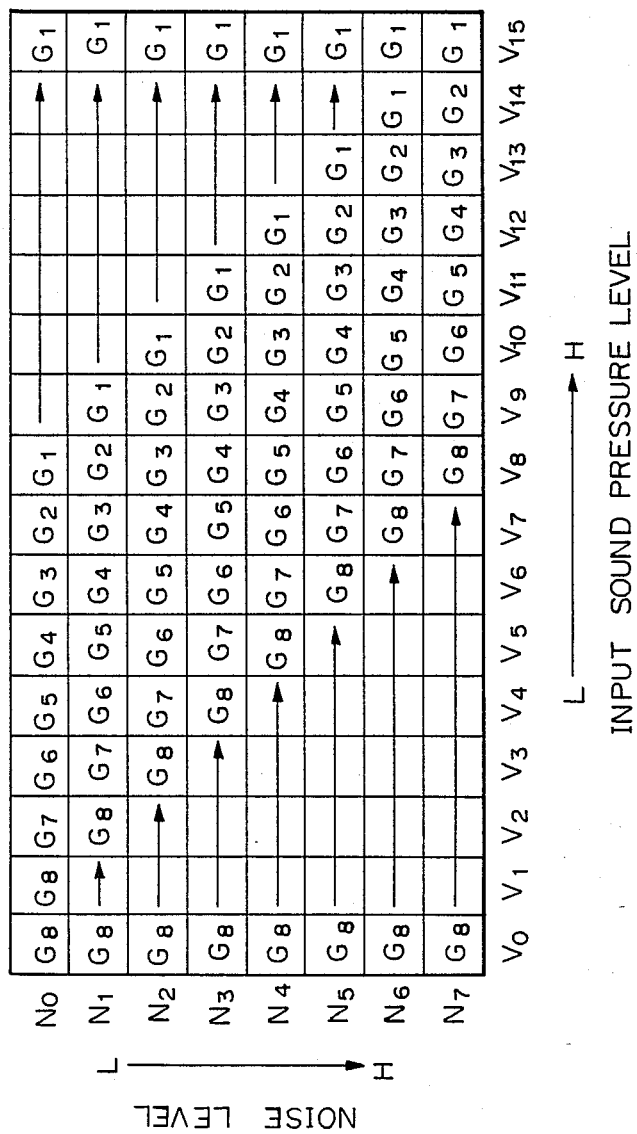

FIG. 16 is a chart for explaining the second embodiment of the gain control shown in FIG. 15. In FIG. 16, the noise level is divided into eight steps $N_0$ to $N_7$, and the gain is also divided into eight steps $G_1$ to $G_8$. Each of arrow lines denotes the same gain value as at the start of the arrow line. The characteristic curve $A_1$ in FIG. 15 corresponds the row of the noise level $N_7$.

Figure 17:
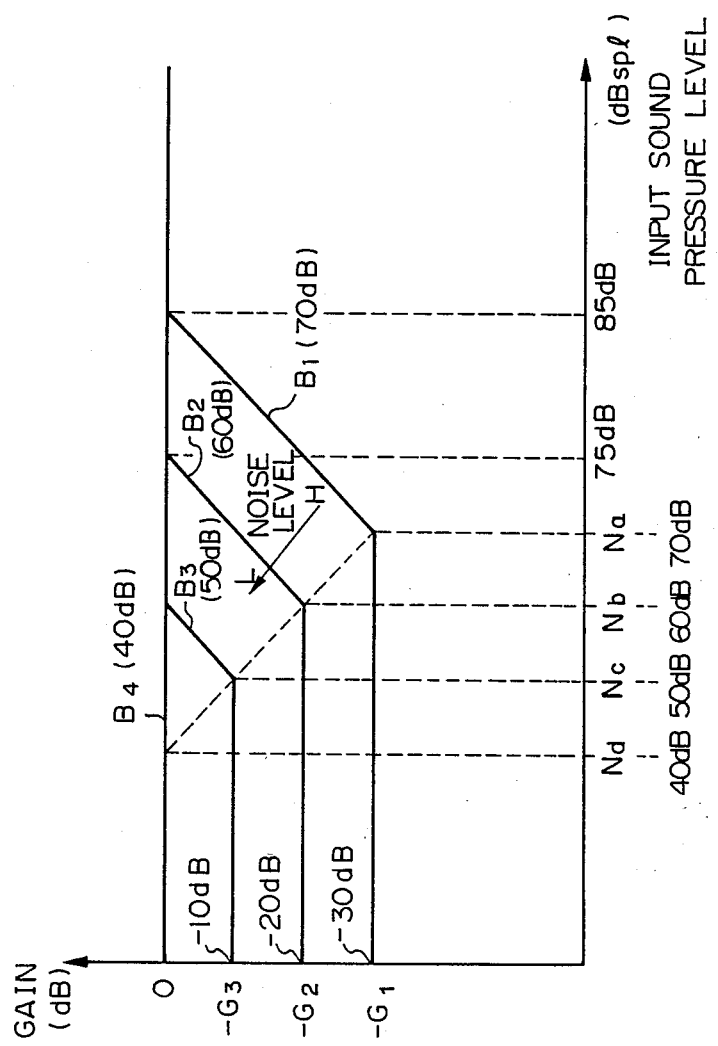

In FIG. 17, the controller controls the variable attenuator in such a manner that when the detected noise level becomes higher, the maximum attenuation quantity at the gain characteristic becomes larger. Namely, the characteristic curve $B_1$ shows the case of a 70 dB noise level, $B_2$ the case of a 60 dB noise level, $B_3$ the case of a 50 dB noise level, and $B_4$ the case of a 40 dB noise level. The maximum attenuation quantity $G_1$ is 30 dB in the curve $B_1$ and the attenuation start level is 85 dB. Further, when the noise level is below 40 dB, the attenuation quantity is set to "0" dB. In this case, since the noise level below 40 dB is very low, no problems occur during actual use. Indeed, the existence of such a low level of noise gives the user a sense of security, because there is no problem of anxiety about whether the telephone call has been cut off.

As one example of the above, when the noise level is $N_c(=50$ dB $)$ and the input sound pressure level is 60 dB, there is no distortion or attenuation of the input sound. Further, the noise level is attenuated by the gain $G_3(-10$ dB $)$, and accordingly, the noise level is suppressed to $N_c-G_3(=50-10$ dB $)$. In this case, when the gain $G_1$ is set to $N_a-N_d(=70-40=30$ dB), the noise level over $N_d$ can be suppressed to $N_d$ ($=40$ dB).

Figure 18:
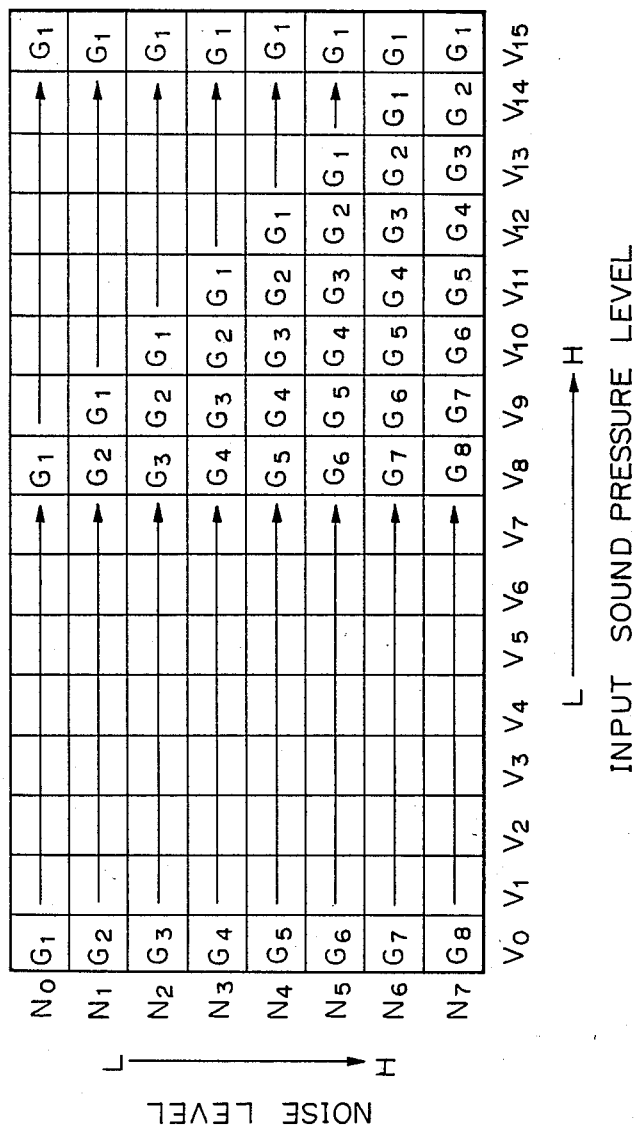

FIG. 18 is a chart for explaining the third embodiment of the gain control shown in FIG. 17. In FIG. 18, the noise level is divided into eight steps $N_0$ to $N_7$, and the gain is also divided into eight steps $G_1$ to $G_8$. Each of the arrowed lines denotes the same gain value as at the start of the arrow line.

Figure 19:
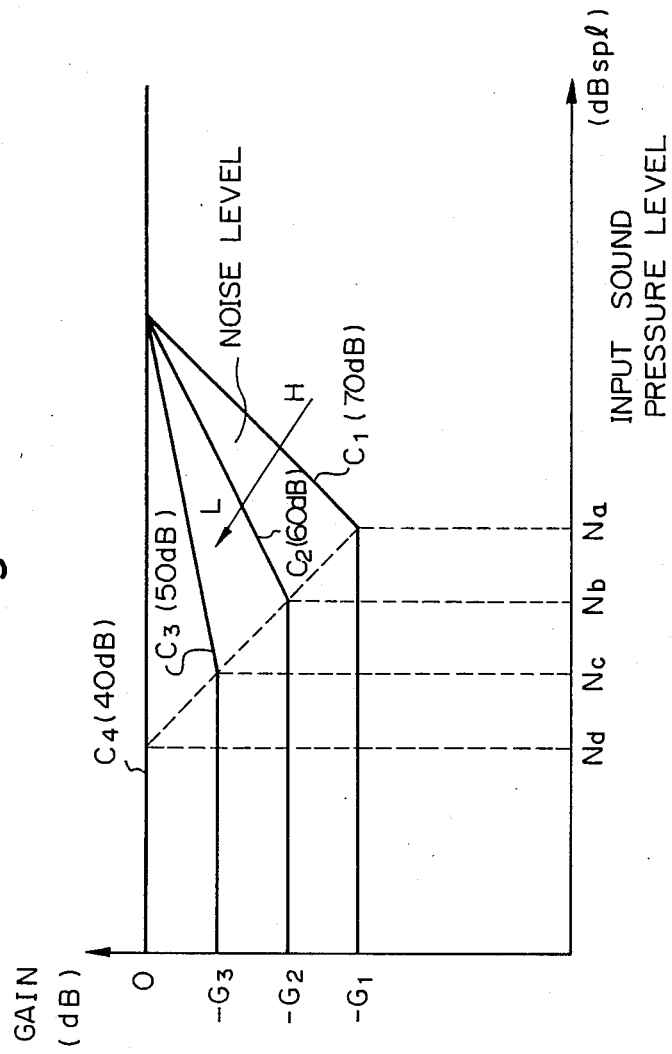

In FIG. 19, the controller controls the variable attenuator in such a manner that when the detected noise level becomes higher, an attenuation slope of the gain characteristic becomes larger. Namely, the slope of the characteristic curve is changed in each of the noise levels $C_1$ to $C_4$. Further, the attenuation start level is the same level in each case, but each attenuation end level $N_a$ to $N_d$ is different.

Figure 20:
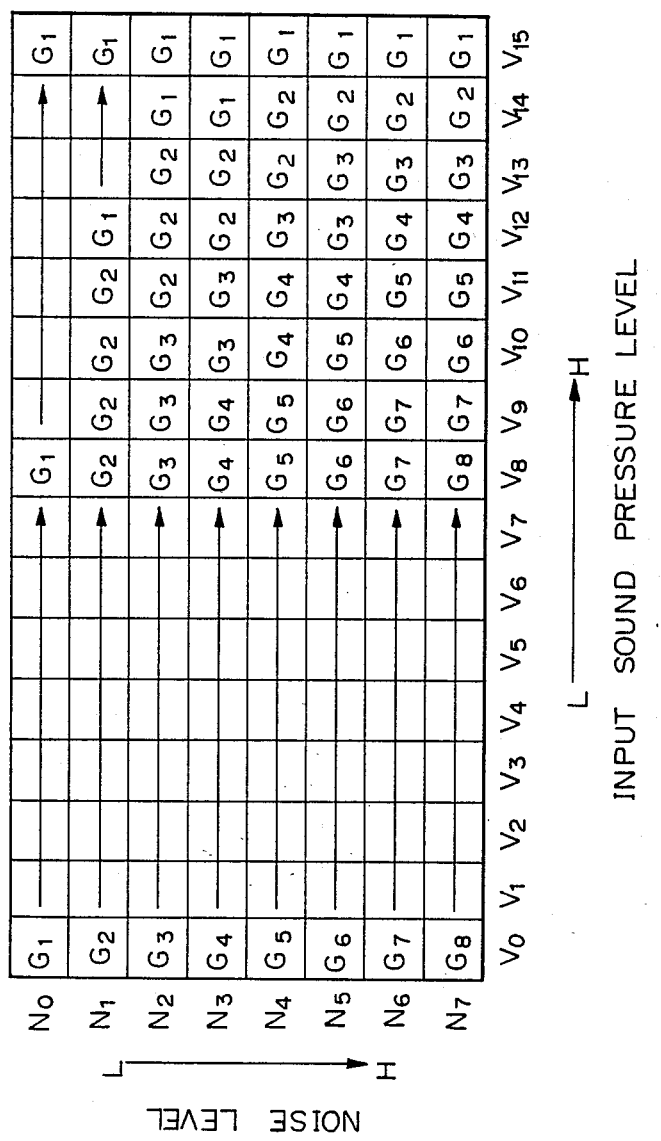

FIG. 20 is a chart for explaining the fourth embodiment of the gain control shown in FIG. 19. In FIG. 20, the noise level is divided into eight steps $N_0$ to $N_7$, and the gain is also divided into eight steps $G_1$ to $G_8$. Each of arrowed lines denotes the same gain value as at the start of the arrow line.

Figure 21:
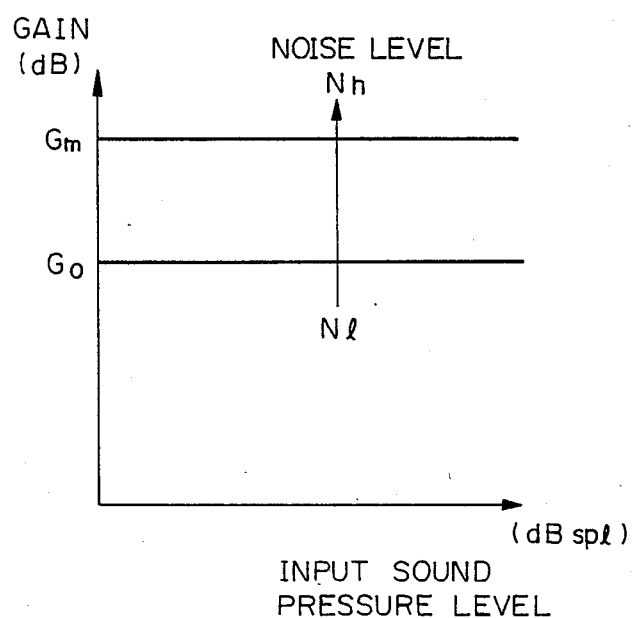
FIG. 21 is a characteristic curve of a gain control in the reception system according to the present invention.

FIG. 21 is a characteristic curve of a gain control in the reception system. The controller controls the variable attenuator in such a manner that when the surrounding noise level is high, the gain of a reception system including the receiver is set to a high value. When the surrounding noise level is low, the gain of the reception system is set to a constant value.

When the surrounding noise level is below the value $N_l$, the gain of the reception system is set to the constant value $G_O$. When the noise level is between the value $G_O$ and $G_m$, the gain of the reception system is gradually increased by reducing the attenuation quantity of the attenuator 22. When the noise level exceeds the value $N_h$, the gain of the reception system is set to the maximum value $G_m$. Usually, the maximum value $G_m$ is decided based on the margin of howling of the receiver.

Further, the control can controller the variable attenuator in such a manner that the higher the detected noise level, the larger at least two of the attenuation start level, the maximum attenuation quantity, and the attenuation slope.

FIG. 22 is a detailed block diagram of one embodiment of the variable attenuator. Reference number 221 denotes a central processing unit (CPU), 222 an electric volume controller, and 223 an operational amplifier. The CPU 221 selects any of resistors $R_1$ to $R_5$. The number of steps at which a change can be made becomes $2^5(=32)$ steps when these resistors are combined. The electric volume controller 222 is a conventional type, for example, model M5241L (made by MITSUBISHI ELECTRIC). The input sound is input to the electric volume controller 222 and the sound level is attenuated by a level control signal from the CPU through the resistors $R_1$ $R_5$. Alternatively, it is possible to utilize a variable resistor (not shown) instead of the electric volume controller.

We claim:

1. An electronic telephone terminal having a handset including a transmitter and a receiver, both having substantially linear acoustic-to-electric transduction characteristics, and having a surrounding noise suppression function, comprising:
    a variable attenuator for controlling a gain of a transmission system;
    noise detection means for detecting surrounding noise; and
    control means for controlling said variable attenuator in such a manner that when a sound pressure level input to said transmitter exceeds a predetermined threshold value, said gain is fixedly set to a constant value, and when said input sound pressure level is equal to or below said predetermined threshold level, said gain is controlled in response to a change in said surrounding noise level detected by said noise detection means.

2. An electronic telephone terminal as claimed in claim 1, wherein said noise detection means is a microphone mounted at a rear side of said terminal opposite to said handset.

3. An electric telephone terminal as claimed in claim 1, wherein said control means controls said variable attenuator in such a manner that when said surrounding noise level is larger than a predetermined noise level, a variable portion of said gain of said transmission system is set to a lower value than said constant value, and when said surrounding noise level is less than the predetermined noise level, said variable portion of said gain is set to a value greater than the lower value and no greater than said constant value.

4. An electronic telephone terminal as claimed in claim 1, wherein said terminal further includes a reception system which includes said receiver, and wherein said control means controls the gain of said reception system in such a manner that when said surrounding noise level is more than a predetermined level, said gain of the reception system is set to a value at least as much as a predetermined maximum value and no greater than said constant value, and when said surrounding noise level is equal to or less than the predetermined level, said gain of said reception system is set to the predetermined minimum value.

5. An electronic telephone terminal as claimed in claim 1, wherein said terminal is a loudspeaker terminal and said receiver is a loudspeaker, and wherein said gain of said reception system is controlled in such a manner that when said surrounding noise level is more than a predetermined level, said gain is set to a value at least as much as a minimum value and no greater than said constant value, and when said surrounding noise is equal to or less than the predetermined level, said gain is set to the minimum value.

6. An electronic telephone terminal as claimed in claim 1, wherein said transmitter is a microphone and said terminal is a loudspeaking telephone terminal, and wherein said microphone acts as said transmitter and as said noise detection means.

7. An electronic telephone terminal having a handset including a transmitter and a receiver, both having substantially linear acoustic-to-electric transduction characteristics, and having a surrounding noise suppression function, comprising:
    a variable attenuator for controlling a gain of a transmission system;
    noise detection means for detecting a surrounding noise level;
    level detection means for detecting an average sound pressure level of a signal output from said noise detection means, and deciding a gain characteristic in response to the detected noise level; and
    control means for controlling said variable attenuator in such a manner that when a sound pressure level input to said transmitter exceeds a predetermined threshold value, said gain is fixedly set to a constant value, and when said input sound pressure level is equal to or below said predetermined threshold level, said gain is controlled in response to a change in said surrounding noise level detected by said noise detection means, and further, said control means controls said variable attenuator based on said gain characteristic decided by said level detection means.

8. An electronic telephone terminal as claimed in claim 7, wherein said control means controls said gain characteristic of said variable attenuator decided by said level detection means in such a manner that when the surrounding noise level becomes larger, the noise suppressing effect of the input sound becomes greater.

9. An electronic telephone terminal as claimed in claim 7, wherein said control means controls said variable attenuator in such a manner that when the surrounding noise level becomes higher, an attenuation start level at said gain characteristic becomes higher.

10. An electronic telephone terminal as claimed in claim 7, wherein said control means controls said variable attenuator in such a manner that when the detected surrounding noise level becomes higher, a maximum attenuation quantity and an attenuation start level at said gain characteristic become larger.

11. An electronic telephone terminal as claimed in claim 7, wherein said control means controls said variable attenuator in such a manner that when the detected surrounding noise level becomes higher, an attenuation slope of said gain characteristic becomes greater.

12. An electronic telephone terminal as claimed in claim 7, wherein said control means controls said variable attenuator in such a manner that when the detected surrounding noise level becomes higher, at least two of an attenuation start level, a maximum attenuation quantity, and an attenuation slope become larger.

13. A telephone terminal comprising:
    receiver means for receiving a reception signal;
    transmitter means for transmitting a sound signal;
    variable attenuator means for controlling gain in said transmitter means;
    noise detecting means for detecting a surrounding noise level;

controlling means for controlling said variable attenuator means based on the surrounding noise level detected by said noise detecting means and a sound pressure level of the sound signal.

14. A telephone terminal according to claim 13, wherein said control means controls said variable attenuator means so that when the sound pressure level of the sound signal is greater than a predetermined threshold level, the gain has a first value, and when the sound pressure level is equal to or less than the predetermined threshold level, the gain is variable, being set to a value based on the detected surrounding noise level.

15. A telephone terminal according to claim 14, wherein when the gain is variable, the gain has a greater value when the detected surrounding noise level has a higher value.

16. A telephone terminal according to claim 14, wherein said telephone terminal is a loudspeaker terminal and said receiver means is a loudspeaker, and wherein the gain is controlled so that when the detected surrounding noise level is equal to or less than a second predetermined threshold level, the gain is set to a second value, and when the detected surrounding noise level is between the predetermined threshold levels the gain is set between the first value and the second value.

17. A telephone terminal according to claim 14, wherein said transmitter means includes a microphone and said terminal includes a loudspeaking telephone terminal, and wherein said microphone forms part of said noise detection means.

* * * * *

UNITED STATES PATENT AND TRADEMARK OFFICE
CERTIFICATE OF CORRECTION

PATENT NO. : 4,908,855
DATED : MARCH 13, 1990
INVENTOR(S) : JURO OHGA ET AL.

It is certified that error appears in the above-identified patent and that said Letters Patent is hereby corrected as shown below:

FRONT PAGE [57] ABSTRACT,
    line 2, "having" should be --including--;
    line 4, "and" should be deleted--;
    line 5, "including" should be --includes--;
    line 6, "system;" should be --system,--;
    line 7, "noise;" should be --noise,--;
    line 8, "attenuator in such a manner" should be --attenuator. The variable attenuator is controlled so--.

Col. 1, line 41, "drawback" should be --drawbacks--.

Col. 2, line 27, "account" should be --account a--.

Col. 3, line 63, "decrease" should be --decreases--.

Col. 4, line 52, "terminal" should be deleted";
    line 53, "the body," should be --the terminal body,--.

Col. 5, line 13, "21" should be --21 and 51,--;
    line 17, "corresponding" should be deleted.

UNITED STATES PATENT AND TRADEMARK OFFICE
CERTIFICATE OF CORRECTION

PATENT NO. : 4,908,855

DATED : MARCH 13, 1990

INVENTOR(S) : JURO OHGA ET AL.

It is certified that error appears in the above-identified patent and that said Letters Patent is hereby corrected as shown below:

Col. 8, line 64, "control can controller" should be --controller can control--.

Col. 9, line 13, "$R_1$ $R_5$" should be --$R_1$ to $R_5$--.

Signed and Sealed this

Ninth Day of April, 1991

Attest:

HARRY F. MANBECK, JR.

Attesting Officer

Commissioner of Patents and Trademarks